(12) United States Patent
Fukuda et al.

(10) Patent No.: US 11,777,366 B2
(45) Date of Patent: Oct. 3, 2023

(54) ELECTRIC MOTOR PROVIDED WITH CONNECTOR TO WHICH POWER SIGNAL IS INPUT, AND METHOD FOR MANUFACTURING ELECTRIC POWER

(71) Applicant: Fanuc Corporation, Yamanashi (JP)

(72) Inventors: Masao Fukuda, Yamanashi (JP); Nobuyuki Ootake, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 193 days.

(21) Appl. No.: 17/079,688

(22) Filed: Oct. 26, 2020

(65) Prior Publication Data
US 2021/0135536 A1 May 6, 2021

(30) Foreign Application Priority Data

Nov. 6, 2019 (JP) .................................. 2019-201535

(51) Int. Cl.
*H02K 5/22* (2006.01)
*H02K 11/215* (2016.01)
*H01R 31/06* (2006.01)
*H02K 15/00* (2006.01)

(52) U.S. Cl.
CPC ............. *H02K 5/225* (2013.01); *H01R 31/06* (2013.01); *H02K 11/215* (2016.01); *H02K 15/0062* (2013.01); *H01R 2201/10* (2013.01)

(58) Field of Classification Search
CPC .... H02K 7/1023; H02K 5/225; H02K 11/215; H02K 11/22; H02K 15/0062; H02K 11/30; H01R 31/06
See application file for complete search history.

(56) References Cited

U.S. PATENT DOCUMENTS

| 5,532,533 | A | 7/1996 | Mizutani |
| 10,404,134 | B2 | 9/2019 | Yoshida et al. |
| 10,559,995 | B2 | 2/2020 | Yoshida et al. |
| 2016/0036289 | A1* | 2/2016 | Kawata .............. B62D 5/0463 310/71 |
| 2017/0201151 | A1* | 7/2017 | Haga .................... H02K 3/28 |
| 2018/0198346 | A1* | 7/2018 | Yoshida ............... G01D 11/30 |
| 2018/0248451 | A1* | 8/2018 | Hagiwara ............. G01D 5/145 |

(Continued)

FOREIGN PATENT DOCUMENTS

| JP | 06292346 A | 10/1994 |
| JP | 05056599 A | 3/1999 |
| JP | 2014117005 A | 6/2014 |

(Continued)

*Primary Examiner* — Leda T Pham
(74) *Attorney, Agent, or Firm* — RatnerPrestia (57) ABSTRACT

An electric motor that can facilitate a process of manufacturing the electric motor. The electric motor includes a substrate mounted with an electronic component, a first connector provided on a stator, the first connector configured to receive a power signal input to a coil and a communication signal with the electronic component, and a wiring structure communicably connecting the electronic component and the first connector. The wiring structure has a second connector mounted on the substrate, and a third connector fixed to the stator, the third connector configured to be connected to the second connector and configured to attach the substrate to the stator by an operation of moving the substrate toward the stator.

7 Claims, 8 Drawing Sheets

(56) References Cited

U.S. PATENT DOCUMENTS

2021/0036577 A1\* 2/2021 Hasegawa .............. H02K 5/225

FOREIGN PATENT DOCUMENTS

| JP | 2015185420 A | 10/2015 | | |
|----|----|----|----|----|
| JP | 2017184542 A | 10/2017 | | |
| JP | 2018113771 A | 7/2018 | | |
| JP | 2018148616 A | 9/2018 | | |
| WO | WO-2019207794 A1 \* | 10/2019 | ........... | H02K 11/215 |

\* cited by examiner

ELECTRIC MOTOR PROVIDED WITH CONNECTOR TO WHICH POWER SIGNAL IS INPUT, AND METHOD FOR MANUFACTURING ELECTRIC POWER

CROSS-REFERENCE TO RELATED APPLICATIONS

This application is a new U.S. Patent Application that claims benefit of Japanese Patent Application No. 2019-201535, filed Nov. 6, 2019, the disclosure of which is incorporated herein by reference in its entirety for all purposes.

BACKGROUND OF THE INVENTION

1. Field of the Invention

The present invention relates to an electric motor provided with a connector to which a power signal is input, and a method for manufacturing the electric motor.

2. Description of the Related Art

An electric motor provided with a connector to which a power signal is input has been known (e.g., JP 2015-185420 A). There has been a demand for a technology that facilitates a process of manufacturing an electric motor.

SUMMARY OF THE INVENTION

In an aspect of the present disclosure, an electric motor includes a stator having a coil; a substrate attached to an axially end portion of the stator, an electronic component being mounted on the substrate; a first connector provided at the stator and configured to receive a power signal to be input to the coil and a communication signal to be communicated with the electronic component; and a wiring structure communicatively connecting the electronic component and the first connector.

The wiring structure includes a second connector mounted on the substrate; and a third connector fixed to the stator, and configured to be connected to the second connector by an operation of moving the substrate toward the stator to attach the substrate to the stator.

In another aspect of the present disclosure, a method of manufacturing the electric motor includes connecting the second connector to the third connector along with moving the substrate toward the stator to attach the substrate to the stator.

According to the present disclosure, the second connector can be connected to the third connector along with moving the substrate toward the support member to attach the substrate to the support member. According to this configuration, it is possible to facilitate the process to connect the second connector to the third connector in the manufacturing of the electric motor.

DETAILED DESCRIPTION

Hereinafter, embodiments of the present disclosure will be described in detail with reference to the drawings. In the various embodiments to be described below, similar elements are denoted by the same reference numeral, and redundant descriptions thereof will be omitted.

Further, in the following description, the axial direction indicates a direction along a rotational axis A of an electric motor, the radial direction indicates a direction of radius of a circle centered about the axis A, and the circumferential direction indicates a circumferential direction of the circle. Further, in the following description, for the sake of convenience, a direction indicated by an arrow B in figures is referred to as frontward in the axial direction (or axially frontward).

Figure 1:
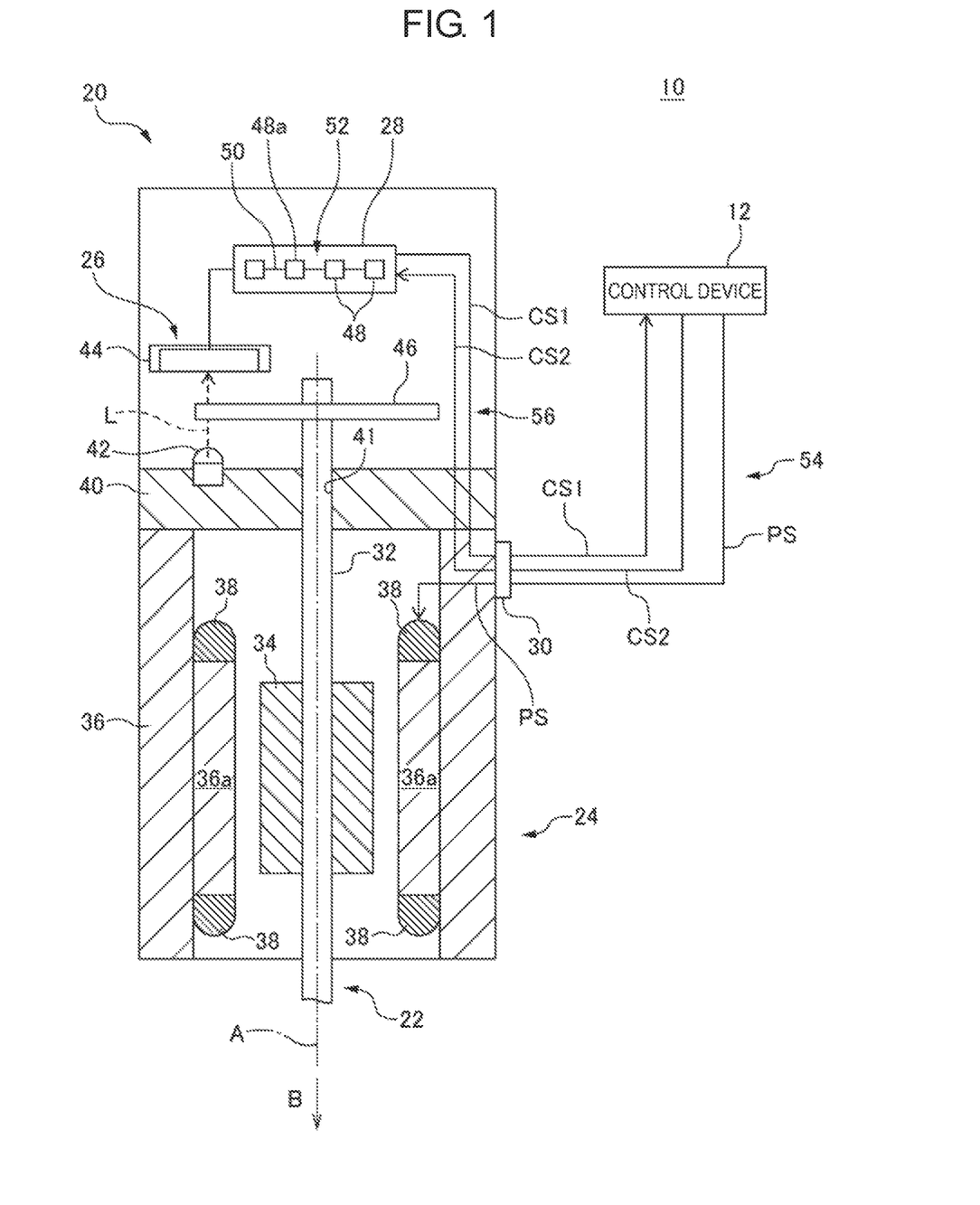
FIG. 1 is a block diagram of a mechanical system according to an embodiment.

With reference to FIG. 1, a mechanical system 10 according to an embodiment will be described. The mechanical system 10 is e.g. a machine tool system for processing a workpiece. The mechanical system 10 includes a control device 12, and an electric motor 20. Specifically, the control device 12 is a computer including e.g. a processor (CPU, GPU, etc.), a memory (ROM, RAM, etc.), and controls an operation of the electric motor 20.

In the present embodiment, the electric motor 20 is a servomotor, and includes a rotor 22, a stator 24, a rotation detector 26, a substrate 28, and a connector 30. The rotor 22 is disposed radially inside of the stator 24 so as to be rotatable about the axis A. The rotor 22 includes a rotary shaft 32, and a rotor core 34. The rotary shaft 32 extends straight in the axial direction. A tool is attached to an axially front end portion of the rotary shaft 32, for example. The rotor core 34 has a plurality of magnets (not illustrated) therein, and is fixed radially outside of the rotary shaft 32.

The stator 24 includes a stator core 36, a coil 38, and a stator housing 40. The stator core 36 is hollow and comprised of a plurality of magnetic steel plates laminated in the axial direction. A plurality of teeth 36a are formed at a radially inner end portion of the stator core 36 so as to align in the circumferential direction. The coil 38 is wound around the teeth 36a.

The stator housing 40 is disposed at an axially rear end of the stator core 36 so as to close the inside of the stator core 36. A through hole 41 is formed at a center of the stator housing 40, and an axially rear end portion of the rotary shaft 32 protrudes axially rearward from the stator housing 40 through the through hole 41.

The rotation detector 26 is disposed axially rear side of the stator core 36, and configured to detect rotation (e.g., a rotational position, a rotation angle) of the rotor 22 of the electric motor 20. In the present embodiment, the rotation detector 26 is a rotary encoder, and includes a light emitting element 42 (e.g., an LED), a light receiving element 44 (e.g., a photoelectric conversion element), and a rotary slit 46.

The light emitting element 42 emits light L (e.g., laser light) toward the light receiving element 44, and the light receiving element 44 receives the light L. The rotary slit 46 is disposed at a position between the light emitting element 42 and the light receiving element 44, and fixed to the axially rear end portion of the rotary shaft 32 so as to rotate integrally with the rotary shaft 32.

Slits for patterning the light L from the light emitting element 42 is formed in the rotary slit 46, and the light L passes through the slits so as to be patterned thereby, and propagates to the light receiving element 44. The light receiving element 44 receives the patterned light L and photoelectrically converts it, and transmits an electric signal corresponding to the light L to an IC chip 48a described later.

The substrate 28 is attached to an axially rear end portion of the stator 24. An electric circuit 52 is mounted on the substrate 28 (so-called a printed circuit board: PCB), and various electronic components 48 (an IC chip, a resistor, an inductor, a capacitor, etc.) are electrically connected by wiring 50 (printed wiring) in the electric circuit 52. In the present embodiment, the electronic components 48 include the IC chip 48a configured to perform signal processing. The IC chip 48a acquires information of the rotation of the rotor 22 from the electric signal received from the light receiving element 44, and transmits the information of the rotation to the connector 30 as a communication signal CS1.

The connector 30 (first connector) is fixed to the stator 24. An electric cable 54 is removably connected to the connector 30, which is communicably connected to the control device 12 through the electric cable 54. The electric cable 54 is e.g. a single composite cable having a plurality of types of conducting wires and a sheath that encloses the plurality of types of conducting wires. The connector 30 receives the communication signal CS1 from the IC chip 48a, and relays the communication signal CS1 to the control device 12 through the electric cable 54.

On the other hand, the control device 12 transmits a command to the IC chip 48a as a communication signal CS2 to the connector 30 through the electric cable 54. The command to be transmitted by the control device 12 to the IC chip 48a includes e.g. a command for starting and stopping rotation detection of the electric motor 20 by the rotation detector 26.

The connector 30 receives the communication signal CS2 from the control device 12, and relays the communication signal CS2 to the IC chip 48a. Additionally, the control device 12 transmits a power signal PS for driving the electric motor 20 to the connector 30 through the electric cable 54. The connector 30 receives the power signal PS from the control device 12, and inputs the power signal PS to the coil 38. The power signal PS is e.g. a three-phase AC (alternating-current) signal, by which the rotor 22 is driven to rotate.

Figure 2:
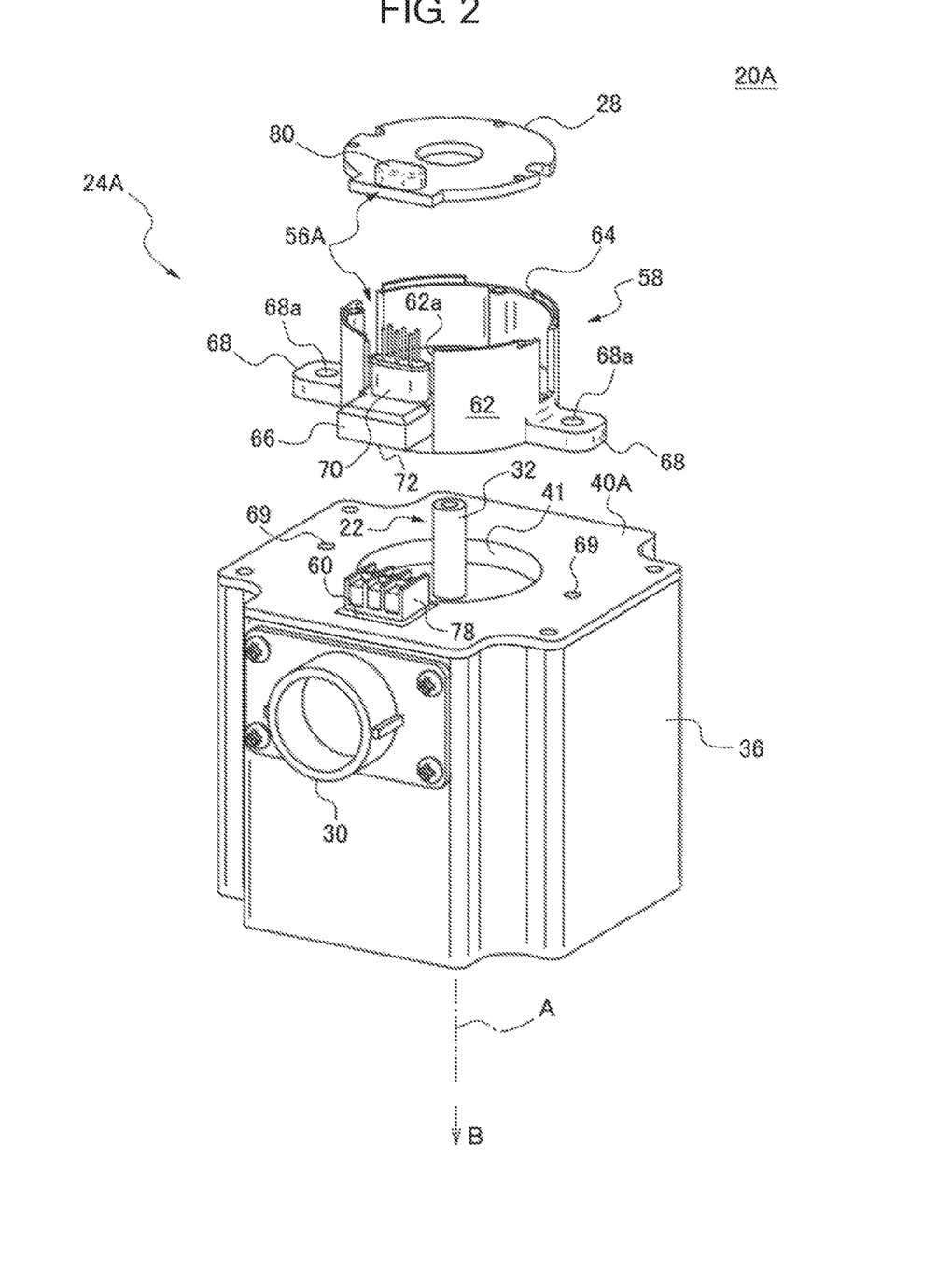
FIG. 2 is an exploded view of an electric motor according to the embodiment.
Figure 3:
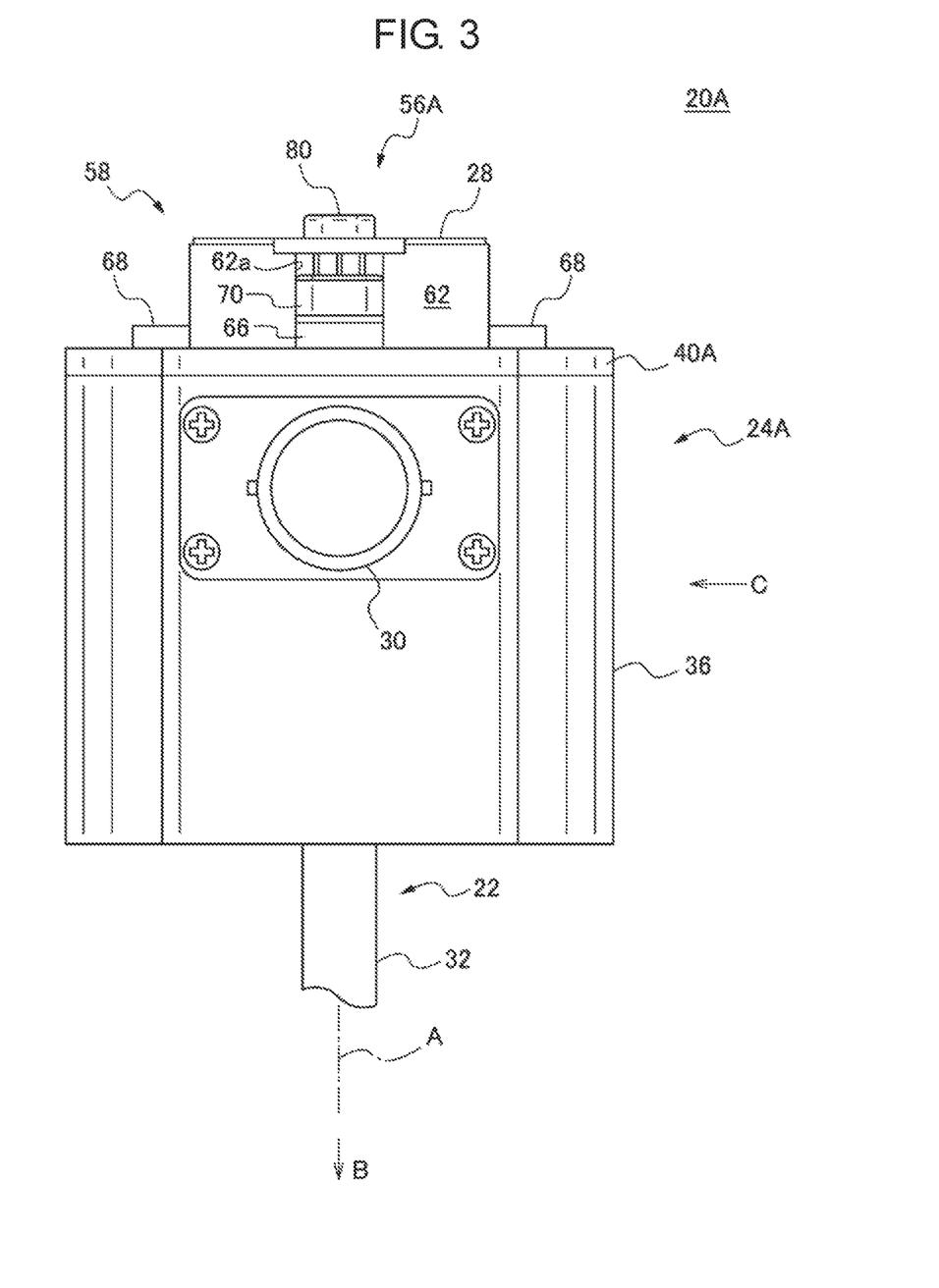
FIG. 3 is a front view of the electric motor illustrated in FIG. 2.
Figure 4:
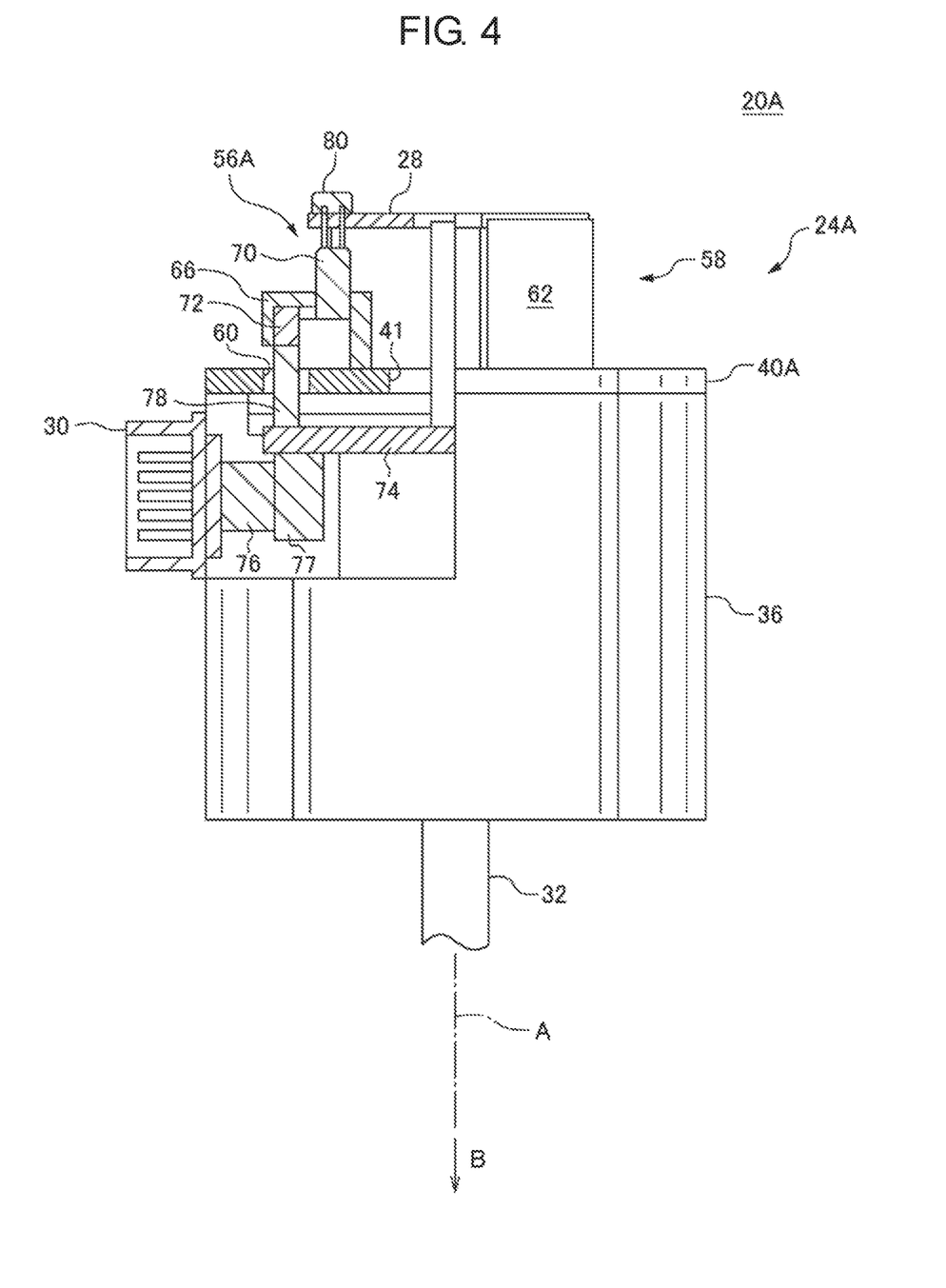
FIG. 4 is a partial cross-sectional view of the electric motor illustrated in FIG. 3, and is a diagram viewed from an arrow C in FIG. 3.

The electric motor 20 further includes a wiring structure 56 that communicably connects the electronic components 48 and the connector 30. Below, a detailed configuration of the electric motor 20 will be described with reference to FIG. 2 to FIG. 4. An electric motor 20A illustrated in FIG. 2 to FIG. 4 is one embodiment of the electric motor 20. Note that the rotation detector 26 is not illustrated in the electric motor 20A, for the sake of easier understanding.

A stator 24A of the electric motor 20A includes the stator core 36, the coil 38 (FIG. 1), a stator housing 40A, and a support member 58. The stator housing 40A is a flat plate member, and disposed in contact with an axially rear end surface of the stator core 36. Through holes 41 and 60 are formed in the stator housing 40A. The through hole 60 is substantially rectangular, and disposed radially outside of the through hole 41.

The support member 58 is attached to the stator housing 40A from opposite side (i.e., axially rear side) of the stator core 36. The support member 58 includes a cylindrical portion 62, a substrate attaching portion 64, a connector mounting portion 66, and a pair of attaching flanges 68. The cylindrical portion 62 is disposed to be substantially concentric to the rotary shaft 32 with respect to the axis A, and the rotation detector 26 described above is housed in the cylindrical portion 62. A slot 62a that divides the cylindrical portion 62 in the circumferential direction is formed in the cylindrical portion 62. The substrate attaching portion 64 is formed at an axially rear end portion of the cylindrical portion 62. In the present embodiment, the substrate attaching portion 64 has a concave shape in which the substrate 28 can be fitted.

The connector mounting portion 66 is disposed in the slot 62a of the cylindrical portion 62 so as to protrude radially outward from the cylindrical portion 62. The connector mounting portion 66 is formed integrally with the cylindrical portion 62. Connectors 70 and 72 are fixed to the connector mounting portion 66. The connector 70 (third connector) protrudes axially rearward from an axially rear end face of the connector mounting portion 66, and oriented so as to face to axially rearward. On the other hand, as illustrated in FIG. 4, the connector 72 (fourth connector) is disposed inside the connector mounting portion 66, and oriented so as to face to axially frontward (i.e., the stator housing 40A). The connector 72 is electrically connected to the connector 70.

The attaching flanges 68 are formed integrally with the cylindrical portion 62 so as to protrude radially outside from the cylindrical portion 62. A fastening hole 68a is formed in each of the pair of attaching flanges 68. When the support member 58 is attached to the stator housing 40A, fasteners (e.g., bolts) are inserted through the respective fastening holes 68a and fastened to respective fastening bores 69 (FIG. 2) formed in the stator housing 40A, thereby securing the support member 58 to the stator housing 40A.

In the present embodiment, the connector 30 is disposed on an outer surface of the stator core 36, and oriented so as to face to radially outside. As illustrated in FIG. 4, a power substrate 74 is fixed inside the stator core 36. The power substrate 74 is an annular flat plate member fixed to the stator core 36 by e.g. soldering.

An electric circuit (not illustrated) is mounted on the power substrate 74, and has wiring (printed wiring) for supplying the power signal PS to the coil 38. A lead wire from the coil 38 is electrically connected to the wiring of the power substrate 74. For example, if the power signal PS is a three-phase AC signal, the wiring of the power substrate 74 includes U-phase power transmission wiring for supplying a U-phase power signal $PS_U$ to the U-phase coil 38m; V-phase power transmission wiring for supplying a V-phase power signal $PS_V$ to the V-phase coil 38; and W-phase power transmission wiring for supplying a W-phase power signal $PS_W$ to the W-phase coil 38.

The connector 30 and the electric circuit mounted on the power substrate 74 are electrically connected to each other by a connector 76 connected to the connector 30 and a connector 77 mounted on the power substrate 74. The power signal PS input to the connector 30 is transmitted through the connectors 76 and 77 to the wiring (the U-phase, V-phase, and W-phase power transmission wiring) of the power substrate 74, and input to the coils 38 (the U-phase, V-phase, and W-phase coils) through the wiring of the power substrate 74. In addition, the connector 78 is mounted on the power substrate 74.

The connector 78 (fifth connector) is electrically connected to the electric circuit mounted on the power substrate 74, and provided so as to protrude axially rearward from the power substrate 74. The connector 78 is oriented so as to face to axially rearward (i.e., the support member 58), and disposed in the through hole 60 of the stator housing 40A such that a distal end portion of the connector 78 protrudes axially rearward from the stator housing 40A through the through hole 60 of the stator housing 40A. In a state in which the support member 58 is attached to the stator housing 40A as illustrated in FIG. 3 and FIG. 4, the connector 78 is connected to the connector 72 provided at the support member 58.

As illustrated in FIG. 2, in the present embodiment, the substrate 28 is an annular flat plate member, and a connector 80 is mounted thereon together with the electric circuit 52 described above. The connector 80 (second connector) is electrically connected to the wiring 50 of the electric circuit 52, and therefore, electrically connected to the electronic components 48 through the wiring 50.

The connector 80 is oriented so as to face to axially forward (i.e., the support member 58). In a state illustrated in FIG. 3 and FIG. 4, the connector 80 is connected to the connector 70 provided at the support member 58. Note that, although not illustrated in FIG. 2 to FIG. 4, the electric circuit 52 is mounted on the axially front side of the substrate 28.

As described above, in the state illustrated in FIG. 3 and FIG. 4, the connector 30 and the electronic components 48 mounted on the substrate 28 are communicably connected to each other via the connector 76, the connector 77, the electric circuit of the power substrate 74, the connector 78, the connector 72, the connector 70, and the connector 80. Accordingly, in the present embodiment, the connector 76, the connector 77, the electric circuit of the power substrate 74, the connector 78, the connector 72, the connector 70, and the connector 80 constitute a wiring structure 56A.

Next, a method of manufacturing the electric motor 20A will be described. First, a manufacturer prepares the substrate 28 on which the electric circuit 52 is mounted; the support member 58 on which the connectors 70 and 72 are provided; the stator housing 40A; the power substrate 74 on which the electric circuit, and the connectors 77 and 78 are mounted; and the stator core 36 at which the connectors 30 and 76 are provided.

Then, the manufacturer fixes the power substrate 74 to the stator core 36, e.g. by soldering, in a state where the connector 77 is connected to the connector 76. Then, the manufacturer (or a robot) moves the stator housing 40A axially frontward toward the stator core 36 such that the connector 78 is inserted into the through hole 60, and fixes the stator housing 40A to the stator core 36 by the fasteners (e.g., bolts).

Then, the manufacturer (or the robot) disposes the support member 58 at axially rear side of the stator housing 40A such that the connector 72 and the connector 78 face to each other in the axial direction, and moves the support member 58 axially frontward toward the stator housing 40A so as to contact the support member 58 with the stator housing 40A.

By this operation of moving the support member 58 toward the stator housing 40A, the connector 72 is connected to the connector 78 in the axial direction. The manufacturer (or the robot) then inserts the fasteners through the fastening holes 68a, and fastens them to the fastening bores 69 (FIG. 2) of the stator housing 40A. In this way, the support member 58 is attached to the stator housing 40A.

Then, the manufacturer (or the robot) disposes the substrate 28 at axially rear side of the support member 58 such that the connector 80 and connector 70 face to each other in the axial direction, and moves the substrate 28 axially frontward toward the support member 58 such that the substrate 28 is fitted into the substrate attaching portion 64 of the support member 58.

By this operation of moving the substrate 28 toward the support member 58, the connector 80 is connected to the connector 70 in the axial direction. Then, the manufacturer (or the robot) fixes the substrate 28 to the support member 58 by fasteners (e.g., bolts). In this way, the substrate 28 is attached to the substrate attaching portion 64 of the support member 58.

As described above, the electric motor 20A includes the wiring structure 56A that communicably connects the electronic components 48 and the connector 30, wherein the wiring structure 56A includes the connector 76, the connector 77, the electric circuit of the power substrate 74, the connector 78, the connector 72, the connector 70, and the connector 80. The communication signal CS1 transmitted by the IC chip 48a is input to the connector 30 through the wiring structure 56A, and relayed by the connector 30 so as to be transmitted to the control device 12. On the other hand, the communication signal CS2 input from the control device 12 to the connector 30 is relayed by the connector 30, and transmitted to the IC chip 48a through the wiring structure 56A.

According to the wiring structure 56A, the connector 80 can be connected to the connector 70 along with the operation of moving the substrate 28 toward the support member 58 in order to attach the substrate 28 to the support member 58. According to this configuration, in the manufacturing process of the electric motor 20A, the connecting operation of the connectors 80 and 70 can be facilitated. Furthermore, since the connecting operation can be performed by the robot, it is possible to automate the manufacturing process.

Moreover, the wiring structure 56A includes the connectors 76 and 77, the connectors 78 and 72, and the connectors 70 and 80, which are inserted into and pulled out from each other, while it does not include a cable line (more specifically, a flexible conducting wire). According to this configuration, a risk of disconnection of the cable line can be eliminated, and the reliability and noise resistance of communication can be improved, while the speed of communication can be increased.

Also, according to the wiring structure 56A, the connector 72 can be connected to the connector 78 along with the operation of moving the support member 58 toward the stator housing 40A in order to attach the support member 58 to the stator housing 40A. According to this configuration, the connecting operation of the connectors 72 and 78 can be facilitated. Since the connecting operation can be performed by the robot, it is possible to automate the manufacturing process.

Figure 5:
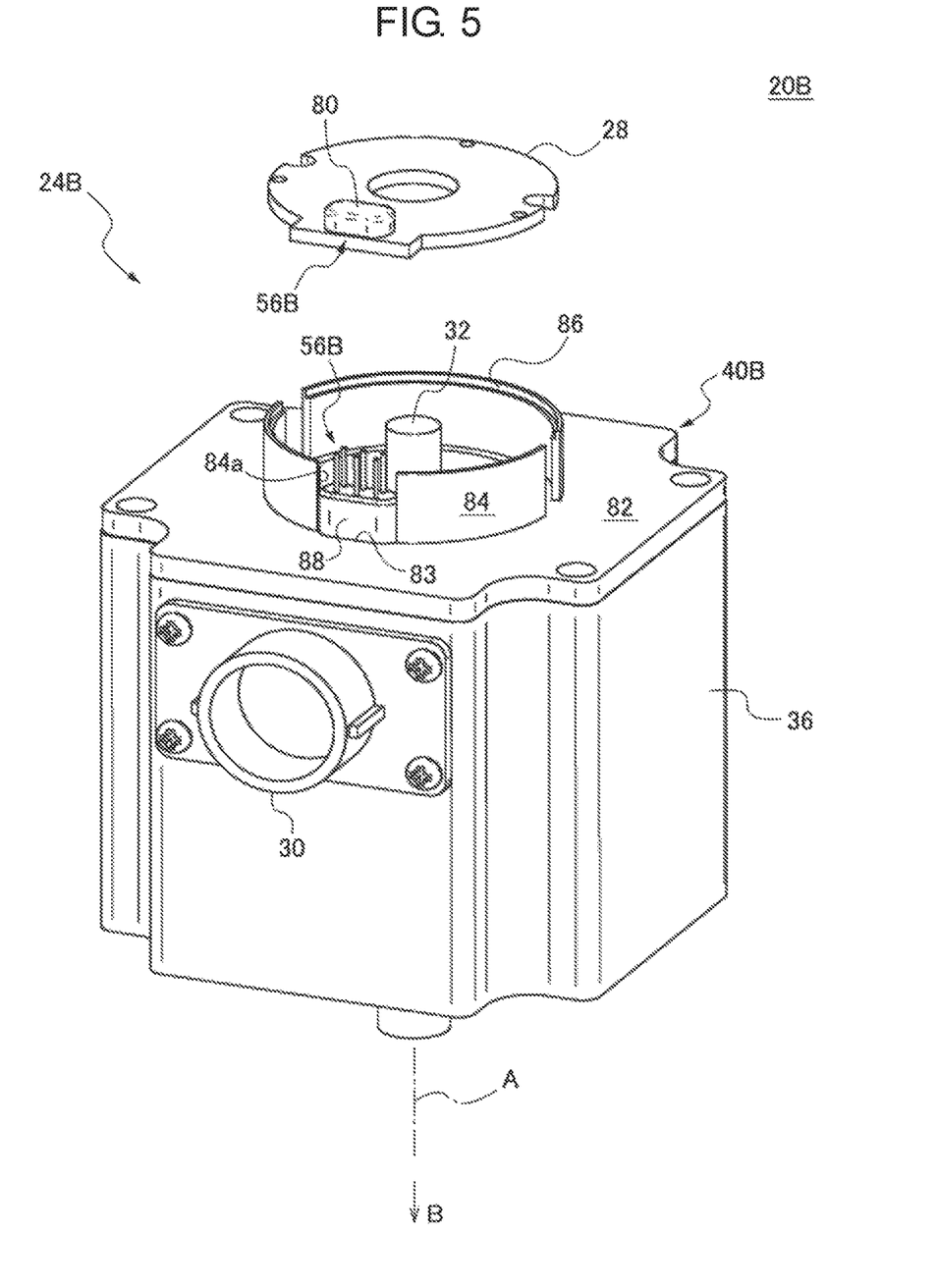
FIG. 5 is an exploded view of the electric motor according to the embodiment.
Figure 6:
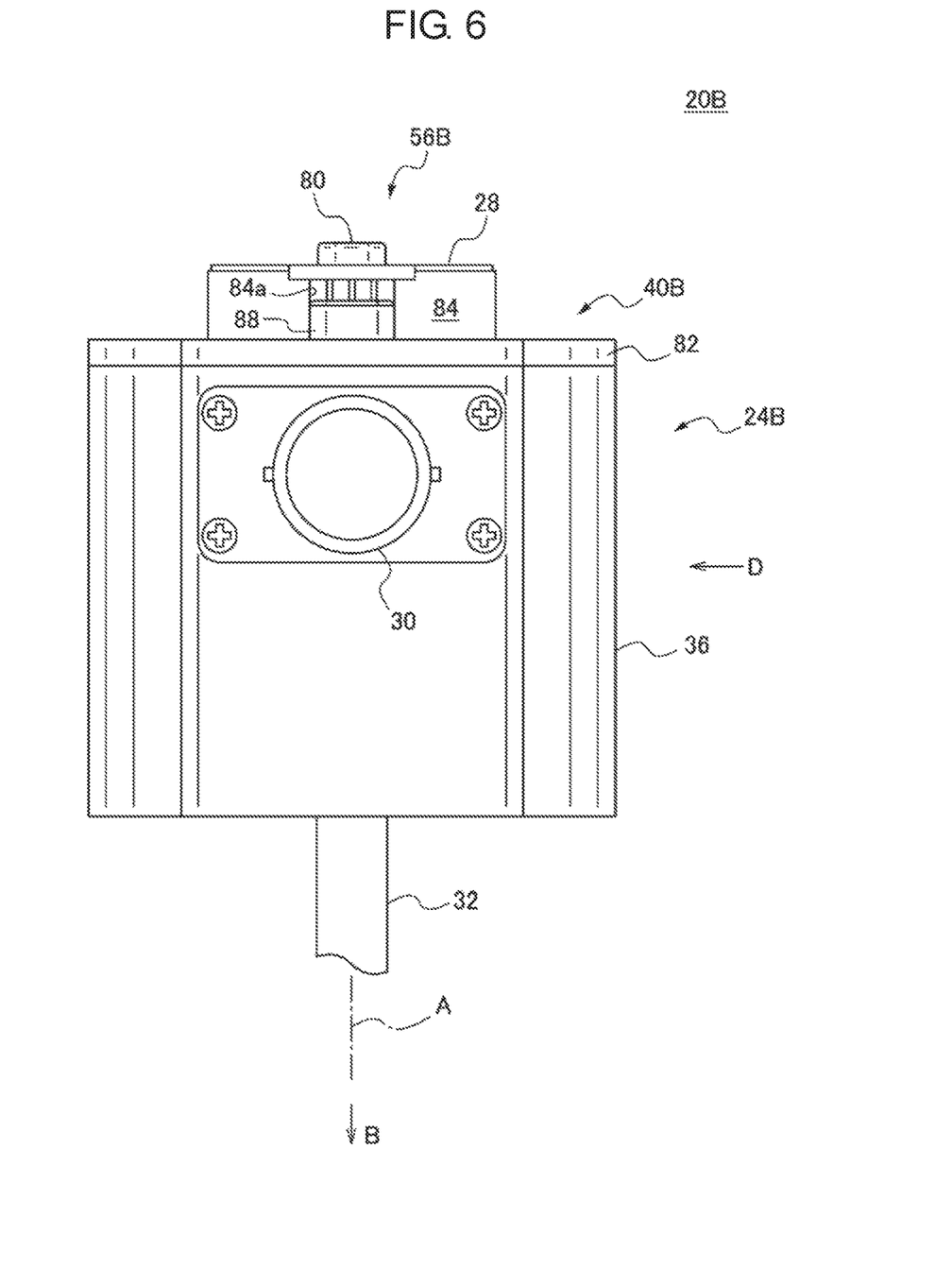
FIG. 6 is a front view of the electric motor illustrated in FIG. 5.

Next, an electric motor 20B will be described with reference to FIG. 5 to FIG. 7. The electric motor 20B is another embodiment of the electric motor 20. Note that the rotation detector 26 described above is not illustrated in the electric motor 20B, in light of easy understanding. A stator 24B of the motor 20B includes the stator core 36, the coil 38 (FIG. 1), and a stator housing 40B.

The stator housing 40B includes a plate portion 82, a cylindrical portion 84, and a substrate attaching portion 86. The plate portion 82 is a flat plate member, and disposed in contact with the axially rear end surface of the stator core 36. The through hole 41 (FIG. 7) and a through hole 83 are formed in the plate portion 82. The through hole 83 is substantially rectangular, and disposed radially outside of the through hole 41. The cylindrical portion 84 is formed integrally with the plate portion 82 so as to protrude axially rearward from the plate portion 82.

The cylindrical portion 84 is disposed to be substantially concentric to the rotary shaft 32 with respect to the axis A, wherein the above-described rotation detector 26 is housed in the cylindrical portion 84. A slot 84a that divides the cylindrical portion 84 in the circumferential direction is formed in the cylindrical portion 84. The slot 84a is in communication with the through hole 83 in the axial direction. The substrate attaching portion 86 is formed at an axially rear end portion of the cylindrical portion 84. In the present embodiment, the substrate attaching portion 86 has a concave shape in which the substrate 28 can be fitted.

Figure 7:
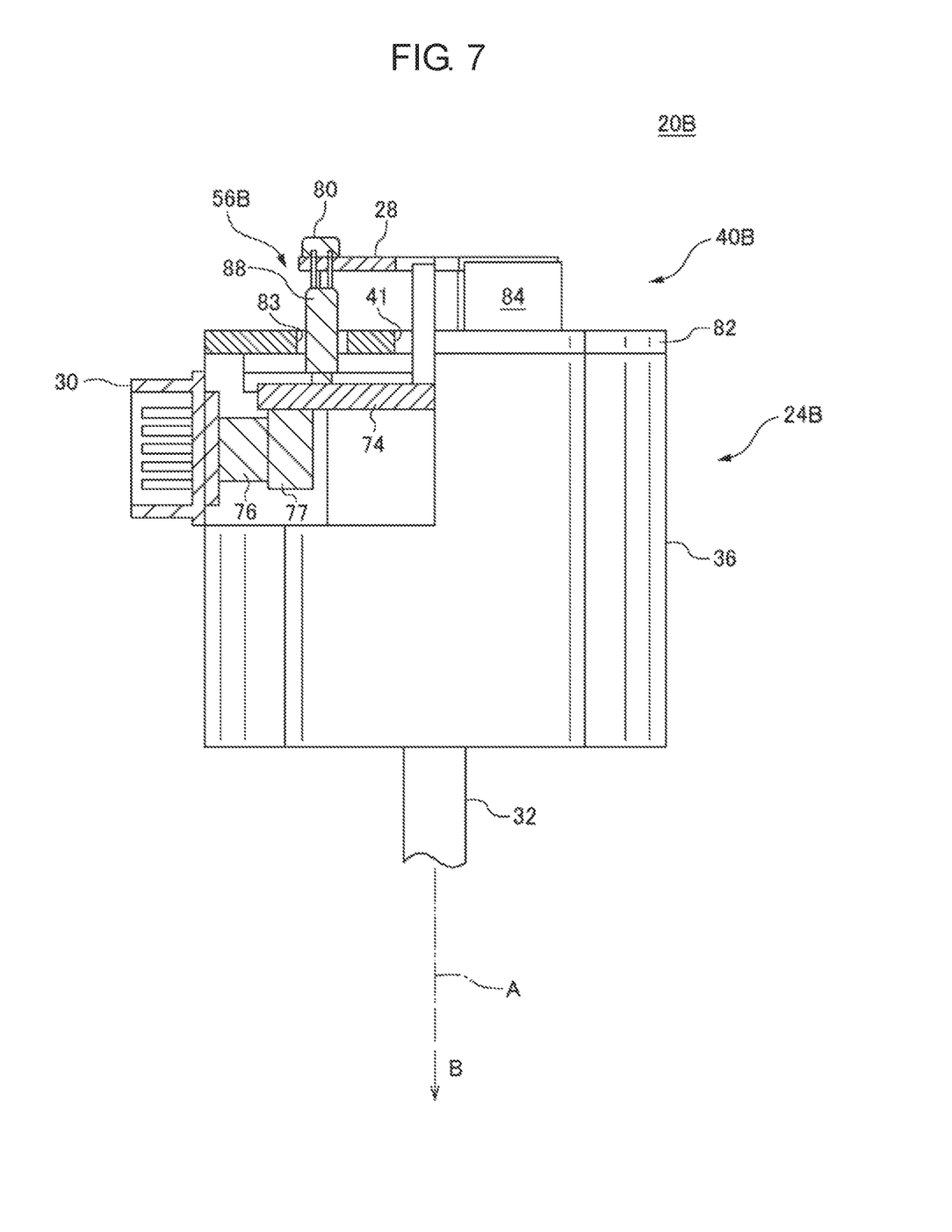
FIG. 7 is a partial cross-sectional view of the electric motor illustrated in FIG. 6, and is a diagram viewed from an arrow D in FIG. 6.

Similarly to the electric motor 20A described above, the power substrate 74 is fixed inside the stator core 36 as illustrated in FIG. 7, wherein the connector 77 is mounted on the axially front side of the power substrate 74, while a connector 88 is mounted on the axially rear side of the power substrate 74. The connector 88 (the third connector) is fixed with respect to the stator core 36 via the power substrate 74. The connector 88 is electrically connected to the electric circuit mounted on the power substrate 74, and protrudes axially rearward from the power substrate 74.

The connector 88 is oriented to face to axially rearward (i.e., the substrate 28), and disposed with respect to the stator housing 40B such that a distal end portion thereof protrudes axially rearward from the plate portion 82 through the through hole 83 of the plate portion 82 so as to be received in the slot 84a of the cylindrical portion 84. In a state in which the substrate 28 is attached to the substrate attaching portion 64 of the stator housing 40B as illustrated in FIG. 6 and FIG. 7, the connector 80 is connected to the connector 88 disposed in the slot 84a of the stator housing 40B.

As described above, in the state illustrated in FIG. 6 and FIG. 7, the connector 30 and the electronic components 48 mounted on the substrate 28 are communicably connected to each other via the connector 76, the connector 77, the electric circuit of the power substrate 74, the connector 88, and the connector 80. Accordingly, in the present embodiment, the connector 76, the connector 77, the electric circuit of the power substrate 74, the connector 88, and the connector 80 constitute a wiring structure 56B.

Next, a method of manufacturing the electric motor 20B will be described. First, the manufacturer prepares the substrate 28 on which the electric circuit 52 is mounted, the stator housing 40B, the power substrate 74 on which the electric circuit, and the connectors 77 and 88 are mounted, and the stator core 36 on which the connectors 30 and 76 are provided. The manufacturer then fixes the power substrate 74 to the stator core 36, e.g. by soldering, in a state where the connector 77 connected to the connector 76.

The manufacturer (or the robot) then moves the stator housing 40B axially frontward toward the stator core 36 such that the connector 88 is inserted into the through hole 83 and the slot 84a, and fixes the stator housing 40B to the stator core 36 by fasteners (e.g., bolts). The manufacturer (or the robot) then disposes the substrate 28 at axially rear side of the stator housing 40B such that the connector 80 and connector 88 face to each other in the axial direction, and moves the substrate 28 axially frontward toward the stator housing 40B so as to fit the substrate 28 into the substrate attaching portion 86 of the stator housing 40B.

By this operation of moving the substrate 28 toward the stator housing 40B, the connector 80 is connected to the connector 88. The manufacturer (or the robot) then fixes the substrate 28 to the stator housing 40B by fasteners (e.g., bolts). In this way, the substrate 28 is attached to the substrate attaching portion 64 of the stator housing 40B.

As described above, the electric motor 20B includes the wiring structure 56B that communicably connects the electronic components 48 and the connector 30, wherein the wiring structure 56B includes the connector 76, the connector 77, the electric circuit of the power substrate 74, the connector 88, and the connector 80. The control device 12 can communicate the communication signals CS1 and CS2 with the electronic components 48 through the wiring structure 56B.

According to the wiring structure 56B, the connector 80 can be connected to the connector 88 along with the operation of moving the substrate 28 toward the stator housing 40B in order to attach the substrate 28 to the stator housing 40B. According to this configuration, in the manufacturing process of the electric motor 20B, the connecting operation of the connectors 80 and 88 can be facilitated. Furthermore, since the connecting operation can be performed by the robot, it is possible to automate the manufacturing process.

Moreover, the wiring structure 56B includes the connectors 76 and 77, and the connectors 88 and 80, which are inserted into and pulled out from each other, while it does not have a cable line (a flexible conducting wire). According to this configuration, a risk of disconnection of the cable line can be eliminated, and the reliability and noise resistance of communication can be improved, while the speed of communication can be increased.

In addition, in the present embodiment, the substrate 28 is attached to the substrate attaching portion 64 formed integrally with the stator housing 40B. According to this configuration, the number of components of the electric motor 20B can be reduced. Accordingly, it is possible to reduce the manufacturing cost, along with simplifying the manufacturing process of the electric motor 20B.

Note that the rotation detector 26 described above is not limited to a rotary encoder, but may have e.g. a Hall element. In this case, the Hall element of the rotation detector 26 transmits to the IC chip 48a an electric signal according to a rotating magnetic field generated by the rotation of the rotor 22. The IC chip 48a acquires information of the rotation of the rotor 22 from the electric signal from the Hall element, and transmits the information of the rotation to the connector 30 as the communication signal CS1.

The power substrate 74 may be fixed to the stator housing 40A (or 40B) by being sandwiched between the stator core 36 and the stator housing 40A (or the plate portion 82). Furthermore, the connectors 76 and 77 may be omitted from the electric motor 20A, and the connector 30 and the electric circuit of the substrate 74 may be connected through an electric cable or the like.

Alternatively, the connectors 72 and 78 may be omitted from the electric motor 20A, and the electric circuit of the power substrate 74 and the connector 70 may be connected through an electric cable or the like. Alternatively, the power substrate 74 may be omitted from the electric motor 20A, and the connector 30 and the connector 70 may be connected through an electric cable or the like. In this case as well, the connecting operation of the connectors 80 and 70 can be facilitated. Similarly, the power substrate 74 may be omitted from the electric motor 20B, and the connector 88 may be fixed to the plate portion, wherein the connector 30 and the connector 88 may be connected through an electrical cable or the like.

Additionally, in the electric motor 20A, 20B, the substrate 28 may be configured so as to be attachable to the substrate attaching portion 64, 86 from the radial direction, for example. For example, the substrate attaching portion 64, 86 may include a groove that slidably receives the substrate 28 in the radial direction, and the substrate 28 may be configured to be fitted into the substrate attaching portion 64, 86 by sliding the substrate 28 in the radial direction in the groove of the substrate attaching portion 64 or 86. In this case, the connector 80 may be oriented to be inserted into or pulled out from the connector 70, 88 in the radial direction.

Figure 8:
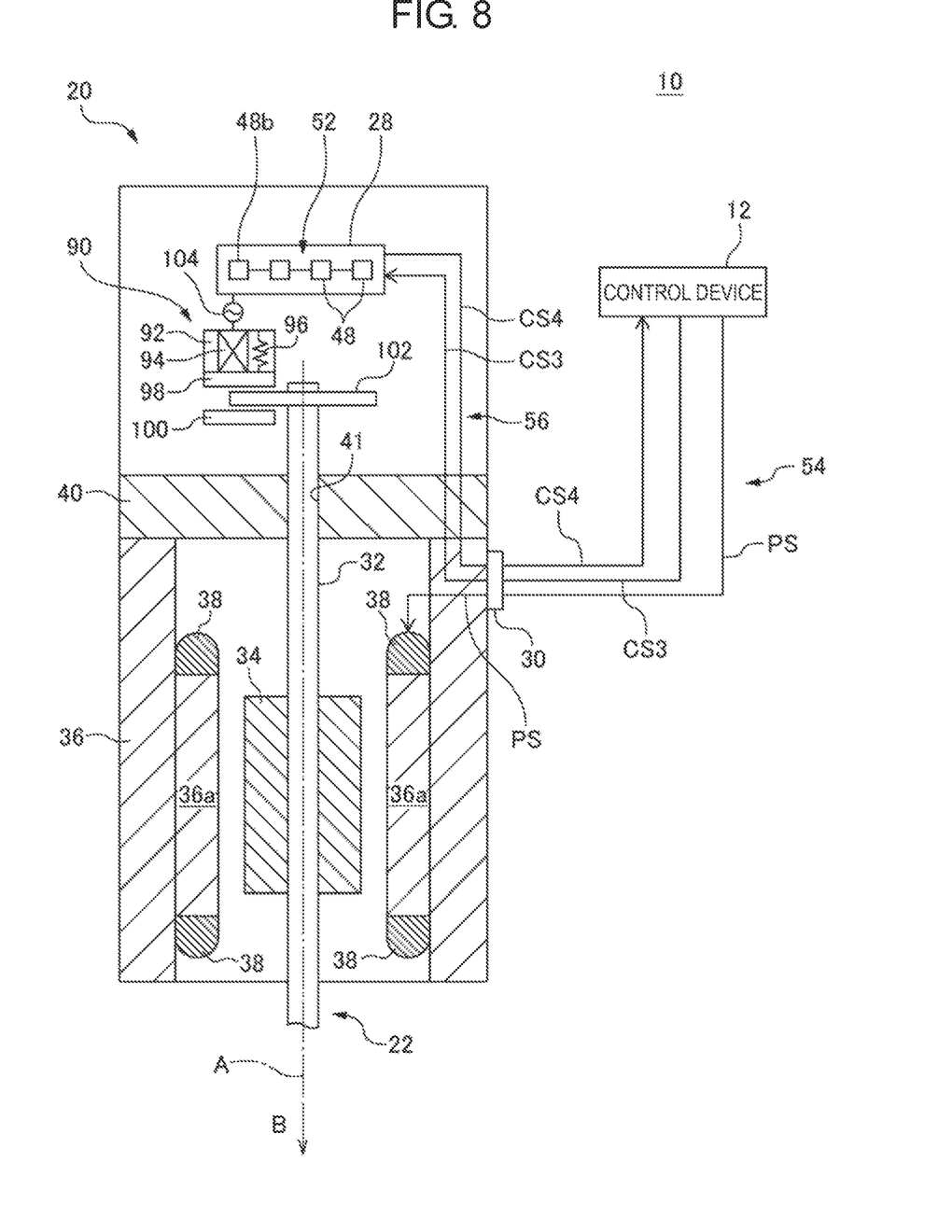
FIG. 8 is a block diagram of a mechanical system according to another embodiment.

Additionally, the electric motor 20 (20A, 20B) may further include a braking mechanism. Such an embodiment is illustrated in FIG. 8. The electric motor 20 illustrated in FIG. 8 includes a braking mechanism 90. The braking mechanism 90 brakes the rotor 22. Specifically, the braking mechanism 90 includes a brake core 92, an excitation coil 94, a biasing member 96, an armature 98, an end plate 100, and a brake disc 102.

The brake core 92 is made of e.g. a magnetic material (such as iron). The excitation coil 94 is housed in the brake core 92, and connected to a brake power source 104. The brake power source 104 applies a voltage to the excitation coil 94. The biasing member 96 is an elastic member such as a coil spring, and biases the armature 98 in a direction toward the brake disc 102. The armature 98 is made of a magnetic material, and provided movably in the axial direction so as to selectively contact with and separate away from the brake disc 102.

The end plate 100 is disposed at a position separated away from the armature 98 in the axial direction. The end plate 100 is fixed to the brake core 92 through a fastener (not illustrated) such as a bolt. The brake disc 102 is a circular plate member disposed to be centered about the axis A. The brake disc 102 is provided on the rotary shaft 32 so as to be immovable in the circumferential direction relative to the rotary shaft 32, and rotates together with the rotary shaft 32. The brake disc 102 is disposed between the armature 98 and the end plate 100.

When the brake power source 104 applies voltage to the excitation coil 94, the brake core 92 is excited, and the armature 98 is attracted to the brake core 92 by magnetic force against the biasing force of the biasing member 96. As a result, the armature 98 is separated away from the brake disc 102, and the braking by the braking mechanism 90 is released.

On the other hand, when the brake power source 104 stops applying the voltage to the excitation coil 94, excitation of the brake core 92 is released, whereby the magnetic force attracting the armature 98 to the brake core 92 disappears. As a result, the armature 98 is pressed against the brake disc 102 by the action of the biasing member 96, whereby the brake disc 102 is held between the armature 98 and the end plate 100. Thus, the braking mechanism 90 brakes the rotor 22.

In the present embodiment, the electronic components 48 include an IC chip 48b for operating the braking mechanism 90. The control device 12 transmits to the connector 30 the information of a command to the IC chip 48b as a communication signal CS3 through the electric cable 54. The communication signal CS3 input to the connector 30 is transmitted to the IC chip 48b via the wiring structure 56 (56A, 56B).

The IC chip 48b operates the brake power source 104 in accordance with the communication signal CS2 from the control device 12, thereby causing the braking mechanism 90 to carry out braking or release the braking. On the other hand, the IC chip 48b transmits state information of the braking mechanism 90 (e.g., information indicating ON/OFF of the braking operation, time information indicating delay of the braking operation, or the like) to the connector 30 via the wiring structure 56 (56A, 56B) as a communication signal CS4. The connector 30 relays and transmits the communication signal CS4 to the control device 12.

Note that the electric motor 20 may include the braking mechanism 90 without the rotation detector 26. Further, the electric motor 20 may include any other device than the rotation detector 26 and the braking mechanism 90. In this case, the electronic components 48 may communicate a communication signal CS with the connector 30 and the control device 12 via the wiring structure 56 (56A, 56B) in accordance with an electric signal from the other device. Although the present disclosure has been described through the above embodiments, the above embodiments are not intended to limit the claimed invention.

The invention claimed is:

1. An electric motor comprising:
   a stator having a stator core around which a coil is wound;
   a substrate attached to an axially end portion of the stator, an electronic component being mounted on the substrate;
   a first connector which is provided on an outer surface of the stator core so as to face to radially outside of the stator core, and to which an electric cable extending from an external device outside of the electric motor is connected, the first connector being configured to receive a power signal to be input to the coil and a communication signal to be communicated between the electronic component and the external device, the power signal and the communication signal being transmitted through the electric cable; and
   a wiring structure communicably connecting the electronic component and the first connector,
   wherein the wiring structure includes:
      a second connector mounted on the substrate; and
      a third connector fixed to the stator, and configured to be connected to the second connector by an operation of moving the substrate toward the stator to attach the substrate to the stator, and
   wherein the wiring structure transmits the communication signal through the second connector and the third connector, while not transmitting the power signal input to the coil.

2. The electric motor of claim 1, further comprising a rotation detector configured to detect rotation of the electric motor,
   wherein the electronic component includes an IC chip configured to transmit information of the rotation detected by the rotation detector as the communication signal to the first connector.

3. The electric motor of claim 1, wherein the stator includes:
   a stator housing provided at an axially end portion of the stator core; and
   a support member attached to the stator housing from opposite side of the stator core, the support member including:
      a substrate attaching portion to which the substrate is attached; and a connector mounting portion to which the third connector is fixed.

4. The electric motor of claim 3, wherein the wiring structure includes:
a fourth connector provided at the support member so as to face the stator housing; and
a fifth connector disposed at the stator housing so as to face the support member, and configured to be connected to the fourth connector by an operation of moving the support member toward the stator housing to attach the support member to the stator housing.

5. The electric motor of claim 1, wherein the stator includes:
a stator core around which the coil is wound; and
a stator housing provided at an axially end portion of the stator core, and including a substrate attaching portion to which the substrate is attached,
wherein the third connector is arranged in the stator housing.

6. A method of manufacturing the electric motor of claim 1, comprising:
connecting the second connector to the third connector along with moving the substrate toward the stator to attach the substrate to the stator.

7. An electric motor comprising:
a stator having a coil;
a rotor rotatably disposed radially inside of the stator;
a rotation detector configured to detect a rotational position or a rotation angle of the rotor;
a substrate attached to an axially end portion of the stator, an electronic component being mounted on the substrate, the electronic component being configured to acquire information of the rotational position or the rotation angle from the rotation detector and output it as a communication signal;
a first connector provided at the stator, and configured to receive a power signal to be input to the coil and the communication signal output from the electronic component; and
a wiring structure communicably connecting the electronic component and the first connector, and configured to transmit the communication signal,
wherein the wiring structure includes:
a second connector mounted on the substrate; and
a third connector fixed to the stator, and configured to be connected to the second connector by an operation of moving the substrate toward the stator to attach the substrate to the stator, and
wherein the wiring structure transmits the communication signal through the second connector and the third connector, while not transmitting the power signal input to the coil.

* * * * *